July 18, 1933.  H. G. BRINTON  1,919,053
ELECTRIC CONTROL CIRCUIT
Filed Dec. 10, 1931
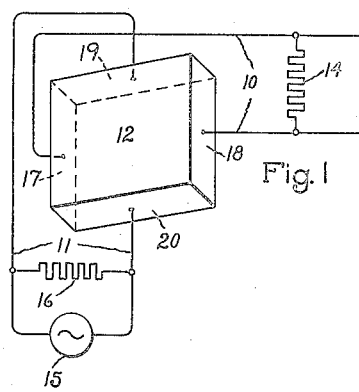
Fig. 1
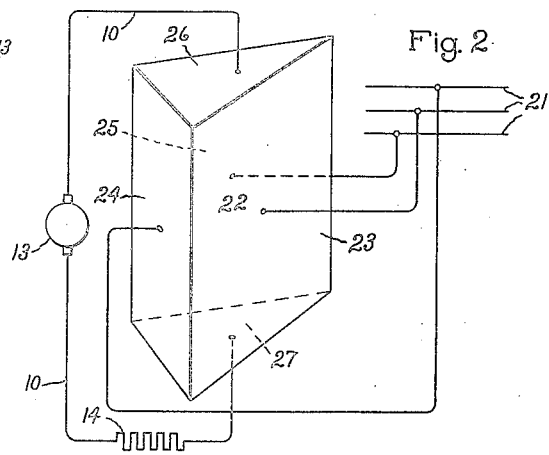
Fig. 2
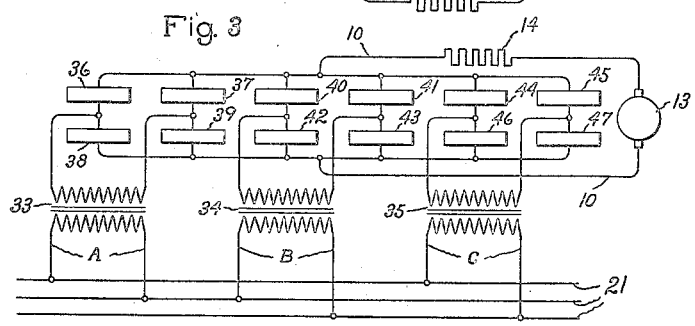
Fig. 3
Fig. 4
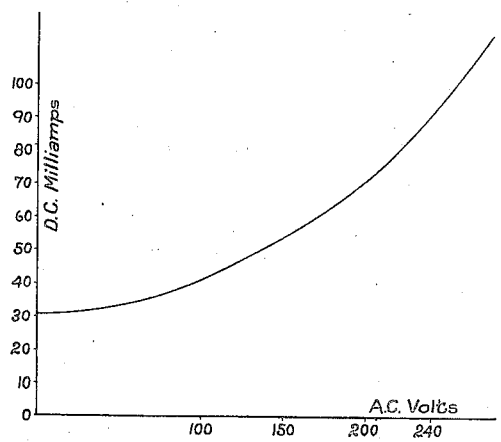
Fig. 5
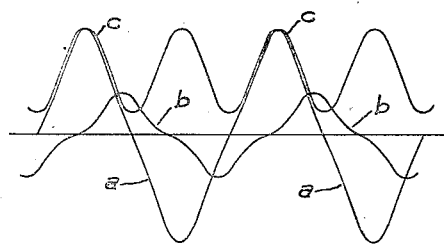
Inventor:
Howard G. Brinton,
by *Chas. V. Tullar*
His Attorney.

Patented July 18, 1933

1,919,053

UNITED STATES PATENT OFFICE

HOWARD G. BRINTON, OF PITTSFIELD, MASSACHUSETTS, ASSIGNOR TO GENERAL ELECTRIC COMPANY, A CORPORATION OF NEW YORK

ELECTRIC CONTROL CIRCUIT

Application filed December 10, 1931. Serial No. 580,113.

My invention relates to electric control circuits and more particularly to an arrangement for controlling an electrical condition of one circuit in response to variations of an electrical condition of a second circuit.

It is often desirable that a change in an electrical condition, such as the voltage, current, power, power factor, etc., of one circuit should control an electric condition of a second circuit. For example, in the well-known case of an alternating current generator provided with a direct current exciter, it is customary to increase the exciter voltage in response to a decrease in the voltage of the alternating current generator. The various types of apparatus heretofore devised for effecting this intercontrol of two electric systems have usually been more or less complicated involving the use of relays, moving contacts and other moving parts.

It is an object of my invention to provide an improved system for controlling an electrical condition of one circuit in response to the variation of an electrical condition of a second circuit which shall overcome the above-mentioned disadvantages and which will be simple, reliable and economical in operation.

It is a further object of my invention to provide an improved static system by means of which the variation of an electrical condition of one circuit will effect a variation of an electrical condition of a second circuit.

A still further object of my invention is to provide an improved static system in which a variation of either current or voltage in a first electric circuit, which may be either an alternating or direct current circuit, will effect a predetermined variation in the voltage or current of a second electric circuit, which may also be either an alternating or a direct current circuit.

In accordance with my invention the circuit which it is desired to control is interconnected with the controlling circuit by means of a resistance unit, the resistance of which varies as a function of the current flowing therethrough. In its broader aspects such a control arrangement is disclosed and claimed in an application of C. A. Nickle, S. N. 580,102, filed December 10, 1931, and assigned to the assignee of the present application. This resistance unit may consist of either a single body of the resistance material having a number of contact faces or points to which the circuits may be connected or a number of resistance elements connected in the form of a Wheatstone bridge with the two circuits connected across the two diagonals of the bridge. The resistance material of which the resistance unit is composed may be of any of the several materials well known in the art having either positive or negative resistance current characteristics. The resistance material described and claimed in Patent No. 1,822,742, granted September 8, 1931, on an application of K. B. McEachron and assigned to the same assignee as the present application, has been found to be particularly suitable for use in connection with my invention. The resistance material described and claimed in the above mentioned application consists, in general, of a mixture of silicon carbide and graphite, the proportions of which and the process of manufacture of which are accurately controlled within narrowly defined limits. It has been found that with the above described arrangement the flow of current in the resistance elements from one of the electric circuits acts in a manner analogous to the saturation of an iron core and decreases the resistance to flow of current from the other electric circuit.

For a better understanding of my invention together with other and further objects thereof, reference is had to the following description taken in connection with the accompanying drawing and its scope will be pointed out in the appended claims. In the drawing, Fig. 1 illustrates my invention as applied to the control of the voltage of a direct current circuit in response to variation of voltage of an alternating current circuit, or vice versa, by means of the use of a single body of resistance material having two pairs of oppositely disposed contact faces; Fig. 2 is a modification of the invention illustrated in Fig. 1 in which one of the circuits is a three phase alternating current circuit; Fig. 3 represents a still further modification of my invention in which the single resistance body is replaced by a resistance unit comprising four resistance elements connected in Wheatstone bridge formation; Fig. 4 represents an alternating voltage-direct current characteristic of a single phase of the arrangement shown in Fig. 3; and Fig. 5 is a reproduction of an oscillogram of the currents and voltages of the same arrangement.

Referring to Fig. 1 of the drawing I have illustrated an arrangement for intercontrolling the voltages of an alternating current circuit 11 and a direct current circuit 10 by means of a resistance unit 12. The circuit 10 is energized from a source of direct current 13 and, as shown, supplies load current to a load device 14. Similarly the alternating current circuit 11 is energized from a source 15 and provides current to a load device 16.

The resistance unit 12 comprises a single body of resistance material provided with two pairs of oppositely disposed contact faces 17 and 18 and 19 and 20 respectively. The direct current circuit 10 is connected to the opposing faces 17 and 18 and the alternating current circuit 11 is connected to the opposing faces 19 and 20. While these connections are diagrammatically illustrated in the figure as point contacts, it will be obvious to those skilled in the art that some sort of contact plate will be provided to secure good conductivity from the circuit to the faces of the resistance unit.

In explaining the operation of the above described arrangement it will be assumed that it is desired to decrease the voltage of the direct current circuit 10 in response to an increase of voltage on the alternating current circuit 11, a result which would be desirable, for example, in case the field of the alternating current generator 15 were excited from the direct current circuit 10. In this case the resistance unit 12 will have a negative current-resistance characteristic and, as the voltage of the alternating current circuit 11 rises above its normal value, the resistance of the unit 12 will decrease an amount depending upon its current-resistance characteristic. The variation in the resistance between the contact faces 19 and 20 is found to exist also between the contact faces 17 and 18 with the result that the resistance in parallel to the load device 14 is decreased, the current drawn from the circuit 10 increased and the voltage of the circuit will be decreased, assuming that the source 13 has a falling load-voltage characteristic. Obviously with a decrease of the voltage of the alternating current circuit 11, a reverse operation takes place and the voltage of the direct current circuit 10 increases.

While I have illustrated my invention as applied to the control of the voltage of a direct current circuit in response to the variations of the voltage of an alternating current circuit, it will be obvious to those skilled in the art that variations in the voltage of the direct current circuit may be utilized to effect variations in the voltage of the alternating current circuit, or that the same arrangement may be employed to effect the intercontrol of the voltage variation of two alternating current circuits or two direct current ciruits, all without departing from my invention, and it will be obvious, also, that in place of controlling the voltage of one circuit in response to the voltage of a second circuit, that the resistance unit 12 may be connected in series relation with the load of either circuit, so that the current of either circuit may be varied in response to variations of either the current or voltage of the other circuit.

In Fig. 2 I have illustrated a modification of my invention in which the current flowing in a direct current circuit 10 is adapted to be controlled in accordance with the voltage of a 3-phase alternating current circuit 21 by means of the resistance unit 22. The resistance unit 22 comprises a block of resistance material provided with opposing contact faces 26 and 27 connected in series relation in the direct current circuit, and with the contact faces 23, 24 and 25 symmetrically disposed and located in planes at right angles to the contact faces 26 and 27. The contact faces 23, 24 and 25 are connected to the several phases of the alternating current circuit 21. The operation of this arrangement is similar to that described in connection with Fig. 1. A variation in the voltage of the alternating current circuit 21 causes a decrease in the resistance of the resistance unit 22 with a corresponding increase in current in the direct current circuit 10. It will be obvious to those skilled in the art that this arrangement may be extended to any number of phases by providing the resistance unit 22 with one contact face for each phase of the polyphase system. It will also be obvious to those skilled in the art that two diametrically opposite contact faces may be provided for each phase of the polyphase system so that a connection to the alternating current circuit 21 analogous to the delta connection may be made or in case it is desired to connect the resistance unit 22 in series relation in the polyphase circuit 21.

In Fig. 3 I have illustrated a still further modification of my invention as applied to intercontrolling the voltage of an alternating current circuit 21 and the current of a direct current circuit 10. According to this modification, each of the resistance units interconnecting the several phases of the alternating current circuit 21 and the direct current circuit 10 is divided into four resistance elements, (preferably with metal plating covering each face) connected in a bridge formation with the alternating and direct current circuit connected across the two diagonals. Thus, phase A is interconnected with the circuit 10 through the transformer 33 and the resistance unit made up of the resistance elements 36, 37, 38 and 39. Phases B and C are similarly connected with the circuit 10 through transformers 34 and 35 and resistance elements 40 to 47 inclusive, respectively. The operation is the same as that described in connection with Figs. 1 and 2. This arrangement has the advantage of utilizing resistance elements of a standard or uniform size for the intercontrol of two circuits, one of which may be of any number of phases. It is apparent that only a single pair of resistance elements need be provided for each resistance unit in case the connections from the alternating current circuit 21 are connected in Y as in Fig. 2. Hence by the use of the term "resistance unit" in the specification and the following claims, it is intended to include both a single body of resistance material having a plurality of connecting contact surfaces or faces or an aggregate of a plurality of these resistance elements connected as illustrated in Fig. 3. It will also be apparent that the system illustrated in Fig. 3 may be extended to any number of phases.

The operating characteristics of the arrangement of Fig. 1 or of a single phase of the arrangements illustrated in Figs. 2 and 3 are shown in Figs. 4 and 5. Fig. 4 illustrates the variations of the current in the direct current circuit with variations in the voltage of the alternating current circuit, the voltage of the source 13 being maintained constant. In Fig. 5 is shown a reproduction of an oscillogram of the current and voltage in both the alternating and direct current circuit. In this figure the curve $a$ represents the alternating potential applied from the generator 15 or one phase of the circuit 21. The curve $b$ represents the alternating current flowing through the resistance unit and the curve $c$ represents the direct current flowing through the resistance unit from circuit 10. From this oscillogram it is seen that the current wave is distorted by the variations of the resistance of the resistance unit with variations in the current density. It is also seen that in this circuit the current lags the applied voltage approximately 90 degrees due to reactance in the circuit. Since the change in resistance of the resistance unit is not dependent upon the direction in which the current is flowing, it is seen from curve $c$ that a double frequency ripple is impressed upon the direct current component. In certain cases it may be desirable to make use of this characteristic by utilizing directly the double frequency pulsating direct current or by connecting a suitable transformer in the direct current circuit from which double frequency alternating current energy may be obtained.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. A system for causing an electric condition of one electric circuit to vary in accordance with variations of an electric condition of a second circuit comprising a body whose resistance varies as a function of the current passing therethrough, a connection between said first circuit and a point on said body, and a connection between said second circuit and another point on said body.

2. A system for causing an electric condition of one electric circuit to vary in accordance with variations of an electric condition of a second circuit comprising a resistance unit whose resistance varies as a function of the current passing therethrough, connections between said first circuit and spaced points of said unit, and connections between said second circuit and other spaced points of said unit.

3. A system for causing the voltage of one circuit to vary in accordance with variations of the voltage of a second electric circuit comprising a resistance unit whose resistance varies instantaneously as a function of the current passing therethrough, connections between said first circuit and spaced points of said unit, and connections between said second circuit and other spaced points of said unit.

4. A system for causing the current in one electric circuit to vary in accordance with variations in the voltage of a second electric circuit comprising a resistance unit having a negative resistance current characteristic, connections between said first circuit and spaced points of said unit, and connections between said second circuit and other spaced points of said unit.

5. In combination, a source of direct current, a source of alternating current, and means for causing an electric condition of one of said circuits to vary in accordance with an electric condition of the other circuit comprising a resistance unit whose resistance varies as a function of the current flowing therethrough, connections between said direct current circuit and spaced points of said unit and connections between said alternating current circuit and other spaced points of said unit.

6. A system for generating a periodic electric wave having double the frequency of an alternating electric wave comprising a direct current circuit, an alternating current circuit, and a body whose resistance varies as a function of the current passing therethrough interconnecting said circuits.

7. A system for generating a pulsating unidirectional current having a frequency double that of an alternating wave comprising a direct current circuit, an alternating current circuit, and a body whose resistance varies instantaneously as a function of the current passing therethrough, interconnecting said circuits.

8. In combination, a plurality of electric circuits and means for causing an electric condition of a first of said circuits to vary in accordance with variations of an electric condition of a second of said circuits comprising a body whose resistance varies as a function of the current passing therethrough, connections between said first circuit and spaced points on said body and connections between said second circuit and other spaced points on said body.

9. In combination, a plurality of electric circuits, and means for causing an electric condition of a first of said circuits to vary in accordance with variations of an electric condition of a second of said circuits comprising a body whose resistance varies as a function of the current therethrough, said body being provided with a plurality of contact faces, connections between said first circuit and certain of said faces, and connections between said second circuit and other of said faces.

10. In combination, two electric circuits and means for causing an electric condition of a first of said circuits to vary in accordance with variations of an electric condition of the second of said circuits, comprising a body whose resistance varies as a function of the current therethrough, said body being provided with two pairs of opposite, symmetrically disposed contact faces, connections between said first circuit and one pair of opposite faces, and connections between said second circuit and the other pair of circuits.

11. In combination, a two wire electric circuit, a polyphase periodic current circuit, means for causing an electric condition of one of said circuits to vary in accordance with variations of an electric condition of the other circuit comprising a body whose resistance varies as a function of the current therethrough, said body being provided with a pair of opposed contact faces and a plurality of other faces approximately normal to said opposed surfaces, connections between said two-wire circuit and said pair of opposed surfaces, and connections between said polyphase circuit and said other surfaces.

12. In combination, a two wire electric circuit, an $n$-phase polyphase circuit, means for causing an electric condition of one of said circuits to vary in accordance with variations of an electric condition of the other circuit comprising a body whose resistance varies as a function of the current flowing therethrough, said body being provided with a pair of opposed contact faces and at least $n$ faces, symmetrically disposed and approximately normal to said opposed surfaces, connections between said two-wire circuit and said pair of opposed surfaces, and connections between said polyphase circuit and said other surfaces.

13. In combination, a plurality of electric circuits, and means for causing an electric condition of a first of said circuits to vary in accordance with variations of an electric condition of a second of said circuits comprising a plurality of elements the resistance of each of which varies as the same function of the current therethrough, said elements being connected in bridge formation with the said circuits connected across the diagonals.

14. In combination, a two wire electric circuit, a polyphase periodic current circuit, and means for causing an electric condition of one of said circuits to vary in accordance with variations of an electric condition of a second of said circuits comprising a resistance bridge for each phase of the polyphase circuit, the two-wire circuit being connected across corresponding diagonals of said bridges and the several phases of the polyphase circuit being connected across the other diagonals each of the elements of said bridges having a resistance which varies as a function of the current therein.

HOWARD G. BRINTON.